United States Patent
Vermola

(10) Patent No.: US 9,084,178 B2
(45) Date of Patent: Jul. 14, 2015

(54) SYSTEM AND METHOD FOR SERVICES ACCESS

(75) Inventor: Larri Vermola, Turku (FI)

(73) Assignee: NOKIA TECHNOLOGIES OY, Espoo (FI)

(*) Notice: Subject to any disclaimer, the term of this patent is extended or adjusted under 35 U.S.C. 154(b) by 2269 days.

(21) Appl. No.: 11/053,981

(22) Filed: Feb. 8, 2005

(65) Prior Publication Data

US 2006/0177028 A1 Aug. 10, 2006

(51) Int. Cl.
- H04M 11/00 (2006.01)
- H04W 48/16 (2009.01)
- H04L 29/08 (2006.01)
- H04W 36/00 (2009.01)

(52) U.S. Cl.
CPC ............. *H04W 48/16* (2013.01); *H04L 67/04* (2013.01); *H04L 67/16* (2013.01); *H04W 36/00* (2013.01)

(58) Field of Classification Search
CPC .......... H04N 21/4622; H04N 21/4383; H04N 21/4821; H04N 21/235; H04N 21/26283; H04N 21/4826; H04N 21/4524; H04N 21/25841; H04H 60/73; H04H 2201/40
USPC ............................................ 455/414.1, 452.2
See application file for complete search history.

(56) References Cited

U.S. PATENT DOCUMENTS

| | | | |
|---|---|---|---|
| 5,758,259 A | 5/1998 | Lawler | |
| 5,886,690 A | 3/1999 | Pond et al. | |
| 6,154,203 A | 11/2000 | Yuen et al. | |
| 6,172,674 B1 | 1/2001 | Etheredge | |
| 6,445,398 B1 | 9/2002 | Gerba et al. | |
| 6,606,747 B1 | 8/2003 | Yuen et al. | |
| 2002/0098832 A1* | 7/2002 | Fleischer et al. | 455/414 |
| 2002/0166128 A1* | 11/2002 | Ikeda et al. | 725/112 |
| 2003/0088778 A1 | 5/2003 | Lindqvist et al. | |
| 2004/0060076 A1* | 3/2004 | Song | 725/145 |
| 2004/0198217 A1 | 10/2004 | Lee et al. | |
| 2004/0203729 A1 | 10/2004 | Makipaa et al. | |
| 2004/0261126 A1 | 12/2004 | Addington et al. | |
| 2005/0083932 A1* | 4/2005 | Lee et al. | 370/390 |
| 2005/0122429 A1* | 6/2005 | Katsube et al. | 348/555 |

FOREIGN PATENT DOCUMENTS

| | | |
|---|---|---|
| EP | 0 886 964 B1 | 8/2002 |
| GB | 2405557 A | 3/2005 |
| GB | 2406754 A | 4/2005 |
| GB | 2407738 A | 5/2005 |
| JP | 05083648 A | 4/1993 |
| JP | 11284930 A | 10/1999 |
| WO | WO 03/045064 A1 | 5/2003 |
| WO | WO 03/069833 A1 | 8/2003 |

OTHER PUBLICATIONS

U.S. Appl. No. 10/879,916, filed Jun. 24, 2004, Vermola.
U.S. Appl. No. 10/880,102, filed Jun. 29, 2004, Vermola.
Supplementary European Search Report for corresponding Application No. 06 75 5816 mailed Dec. 5, 2013 7 pages.

* cited by examiner

*Primary Examiner* — Khalid Shaheed
*Assistant Examiner* — Shantell L Heiber
(74) *Attorney, Agent, or Firm* — Ditthavong & Steiner, P.C.

(57) ABSTRACT

Systems and methods applicable, for instance, in services access. For example, a node and/or other computer that moves to another area may act to determine the availability of services to which service entries correspond, and/or the availability of similar services. As another example, a node and/or other computer that moves to another area may act to modify service entries.

19 Claims, 6 Drawing Sheets

SYSTEM AND METHOD FOR SERVICES ACCESS

FIELD OF INVENTION

This invention relates to systems and methods for services access.

BACKGROUND INFORMATION

In recent times, there has been an increase in the use of services. For example, many users have come to prefer services such as, for instance, television services, radio services, teletext services, audio services, video services, push services, and internet page services to other sources of information, entertainment, data, and the like.

Accordingly, there may be interest in technologies that, for example, facilitate services access.

SUMMARY OF THE INVENTION

According to embodiments of the present invention there are provided systems and methods applicable, for instance, in services access.

In various embodiments, a node and/or other computer that moves to another area may act to determine the availability of services to which service entries correspond, and/or the availability of similar services. Moreover, in various embodiments a node and/or other computer that moves to another area may act to modify service entries.

DETAILED DESCRIPTION OF THE INVENTION

General Operation

According to embodiments of the present invention there are provided systems and methods applicable, for instance, in services access.

In various embodiments a node and/or other computer may have access to service entries corresponding to a particular area. In the case where the node and/or other computer moves to another area, one or more operations may, in various embodiments, be performed.

For example, in various embodiments determination may be made as to whether or not a service to which a service entry corresponds is available in the area to which the node and/or other computer has moved.

Where the service is found to be available, one or more operations may, in various embodiments, be performed to, for instance, modify the service entry to allow access to the service as available at the area to which the node and/or other computer has moved.

Where the service is not found to be available, one or more operations may, in various embodiments, be performed to, for instance, determine if one or more services similar to the service are available at the area to which the node and/or other computer has moved. Where one or more such similar services are found, one or more operations might, in various embodiments, be performed to, for example, modify the service entry to correspond to one or more of the similar services.

Various aspects of the present invention will now be discussed in greater detail.

Service Entries Establishment

Figure 1:
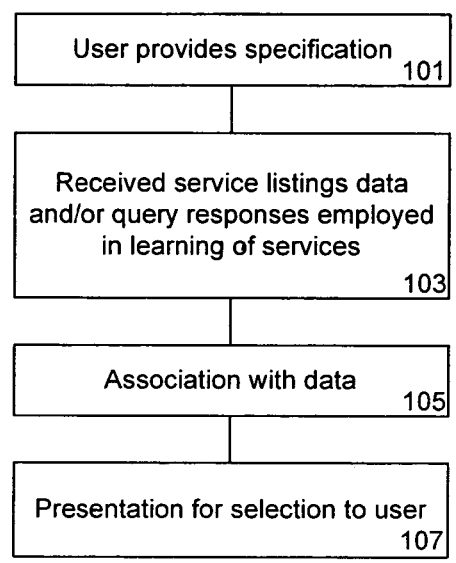
FIG. 1 shows exemplary steps involved in service entries establishment according to various embodiments of the present invention.

According to various embodiments of the present invention a node and/or other computer (e.g., a wireless node) may act to establish one or more service entries corresponding to a particular area (e.g., a home area). Such service entries might, for example, be channel list members and/or user presets. With respect to FIG. 1 is noted that, in various embodiments, establishment of service entry may be in accordance with specification provided (e.g., via a Graphical User Interface (GUI) and/or other interface) by a user of the node and/or other computer (step 101). Established service entries might, for instance, be stored at a location accessible by the node and/or other computer (e.g., a local or remote store).

In establishing service entries the node and/or other computer might, in various embodiments, act to employ received service listings data (e.g., channel listings data, electronic program guide (EPG) data, electronic service guide (ESG) data, and/or interactive service guide (ISG) data) and/or query responses in learning of the services available in the area (step 103). It is noted that, in various embodiments, a node and/or other computer might dispatch one or more queries (e.g., to a server and/or other computer) regarding available services. Such queries might, for instance, request various data to be employed in establishing service entries. Such queries might, in various embodiments, be responded to using service listings data, and/or the node and/or other computer may come to receive service listings data in response to such queries.

Services might, for example, include television services, radio services, teletext services, audio services, video services, push services, and/or internet page services. Receipt of the services might, for instance, involve Internet Protocol Datacast (IPDC), Universal Mobile Telecommunications Service (UMTS), General Packet Radio Service (GPRS), Bluetooth, Ultra Wide Band (UWB), WiFi (e.g., 802.11g), Short Message Service (SMS), Multimedia Messaging Service (MMS), email, Simple Object Access Protocol (SOAP), Java Messaging Service (JMS), Remote Method Invocation (RMI), Multimedia Broadcast and Multicast Service (MBMS), Digital Video Broadcast (DVB) (e.g., terrestrial digital video broadcast (DVB-T), Digital Video Broadcasting: Handhelds (DVB-H), and/or Satellite Digital Video Broadcast (DVB-S)), Digital Audio Broadcast (DAB), Digital Radio Mondial (DRM), Internet Protocol (IP), Amplitude Modulation (AM) radio, Frequency Modulation (FM) radio (e.g., FM subcarrier), Radio Data Service (RDS), satellite radio, television, digital television, satellite television, National Television System Committee (NTSC) television, and/or Phase Alternating Line (PAL) television. It is noted that, in various embodiments, services might include combinations of the foregoing.

For example, in various embodiments, receipt might be via blanking interval, an IPDC data stream might be received, a tuner of a node and/or other computer might be set to a particular frequency, a node and/or other computer might access data from a particular network address (e.g., an IP address), and/or a node and/or other computer might associate itself with a multicast address (e.g., an IP multicast address).

As noted above, a node and/or other computer may come to learn of available services. In various embodiments, the node and/or other computer might act to establish a channel list member for each of one or more of the available services. Establishment of channel list members might, for instance, be such that selection of a channel list member by a user (e.g., via a GUI and/or other interface) could result in consumption of a corresponding service by the user via her node and/or other computer. Accordingly, establishment of a channel list member could, for instance, involve association of the channel list member with data, perhaps received via service listings data and/or query responses, such as IP addresses (e.g., IP multicast addresses), transmission frequencies, descriptive data (e.g., metadata), specification of one or more software modules to be employed in service consumption, and/or various data received via service listings data and/or query responses (step 105).

Such channel list members could be presented for selection to the user (step 107) in a number of ways. For example, one or more GUI widgets (e.g., buttons) could be presented to a user, each widget corresponding to a channel list member and presenting corresponding identifying information (e.g., text and/or graphics identifying the service to which the channel list member corresponds). Alternately or additionally, such channel list members could be presented via a service listing (e.g., a time grid).

Accordingly, for example, the node and/or other computer might employ a GUI and/or other interface in presenting established channel list members to its user as part of a time grid, with indications of various service offerings (e.g., programs) provided for each channel list member. The indications of service offerings might, for instance, be presented with respect to various time ranges. Accordingly, for instance, the grid might present for each of one or more channel list members the service offerings to be available during a certain block of time.

It is noted that, according to various embodiments, channel list members may be presented to the user in a particular order. Such an order might be established in a number of ways. For example, the order might be in accordance with specification provided by the user (e.g., via a GUI and/or other interface), be in accordance with specification provided by a system administrator, be in accordance with specification provided by a service provider, and/or be in accordance with specification provided via received service listings data and/or query responses.

In establishing user presets the node and/or other computer might, for instance, act to employ received service listings data and/or query responses in making the user aware of services available in the area, and/or might allow the user to select one or more of the available services to correspond to presets. A GUI and/or other interface might, in various embodiments, be employed.

Perhaps in a manner analogous to that discussed above, establishment of such user presets might, for instance, be such that selection of a preset by a user (e.g., via GUI) could result in consumption of a corresponding service by the user via a node and/or other computer. Moreover, perhaps in a manner analogous to that discussed above, establishment of a preset could, for instance, involve association of the preset with data (e.g., data of the sort discussed above). Some or all of such data might, for example be known via received service listings data and/or query responses.

To illustrate by way of example, a user informed that a particular television news service, a particular radio sports service, and a particular television music video service were available might provide specification (e.g., via a GUI and/or other interface) that the news service should correspond to a first preset and that the music video service should correspond to correspond to a second preset.

Presets might, for example, be presented to a user for selection in a manner analogous to that discussed above with respect to selection of channel list members (e.g., GUI buttons might be employed), with selection resulting in consumption of a corresponding service by the user via the node and/or other computer. As another example, presets might be associated with physical buttons of the node and/or other computer. For instance, the user might, perhaps in a manner analogous to that discussed above, be able to specify a preset to be associated with a particular physical button. Pressing of a button associated with a preset could, for instance, result, perhaps in a manner analogous to that discussed above, in consumption of a corresponding service by the user via the node and/or other computer.

It is noted that, in various embodiments, the user might, perhaps in a manner analogous to that discussed above, be able to specify presentation order for presets.

It is further noted that, in various embodiments, dispatch and/or receipt (e.g., of service listings data, queries, and/or query responses) might, for instance, involve IPDC, UMTS, GPRS, Bluetooth, UWB, WiFi, SMS, MMS, email, SOAP, JMS, RMI, MBMS, DVB (e.g., DVB-T, DVB-H, and/or DVB-S), DAB, DRM, IP, AM radio, FM radio (e.g., FM subcarrier), satellite radio, satellite television, NTSC television, and/or PAL television. For example, in various embodiments, receipt might be via blanking interval, an IPDC data stream might be received, a tuner of a node and/or other computer might be set to a particular frequency, a node and/or other computer might access data from a particular network address (e.g., an IP address), and/or a node and/or other computer might associate itself with a multicast address (e.g., an IP multicast address). In various embodiments, queries might be dispatched to a server and/or other computer (e.g., one operated by a service provider), and/or service listings data and/or query responses might be provided by such a server and/or other computer.

It is additionally noted that, in various embodiments, a service entry may be established to correspond to more than one service.

Location Change Operations

According to various embodiments of the present invention, one or more operations may be performed in the case where a node and/or other computer changes location (e.g., moves to a different service area). Such operations might, in various embodiments, make use of received service listings data (e.g., channel listings data, EPG data, ESG data, and/or ISG data). Perhaps in a manner analogous to that discussed above, a node and/or other computer might, in various embodiments, dispatch one or more queries (e.g., to a server and/or other computer) regarding available services. Such queries might, for instance, request various data to be employed in location change operations. Such queries might, in various embodiments, be responded to using service listings data, and/or the node and/or other computer may come to receive service listings data in response to such queries.

The node and/or other computer, for example, might act to determine, for each of one or more of accessible service entries (e.g., channel list members and/or user presets), whether or not the service to which the service entry was established to correspond is available in the area to which the node and/or other computer has moved. Such functionality could be implemented in a number of ways.

Figure 2:
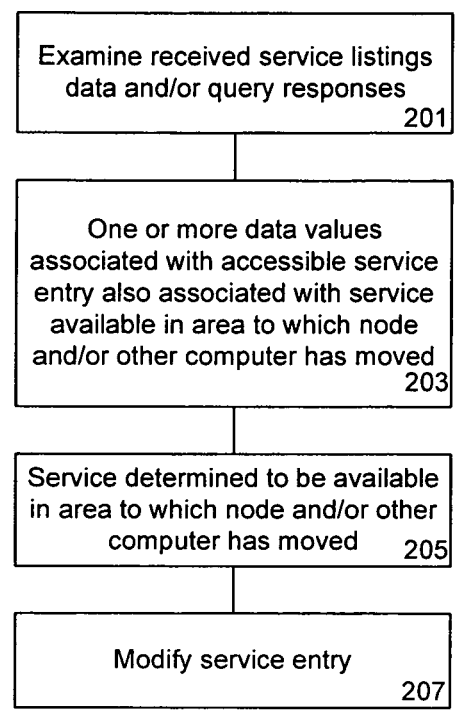
FIG. 2. shows exemplary steps involved in location change operations according to various embodiments of the present invention.

With respect to FIG. 2 it is noted that, for example, the node and/or other computer might act to examine received service listings data and/or query responses regarding services available in the area to which the node and/or other computer has moved (step 201). The node and/or other computer, for instance, might consider a service to which an accessible service entry was established to correspond to be available in the area to which the node and/or other computer has moved in the case where one or more data values associated with the accessible service entry were, by way of received service listings data and/or query responses, also associated with a service available in the area to which the node and/or other computer has moved (step 203).

Such data values might, for example, be metadata values, identifier values (e.g., unique identifier values), title values, corporate ownership values, network affiliation values, descriptive text values (e.g., content descriptions), service network address values (e.g., service IP address values), session identifier values, service identifier values, channel values (e.g., channel names and/or identifiers), category identifier values, ESG values (e.g., ESG identifiers), EPG values (e.g., EPG identifiers), ISG values (e.g., ISG identifiers), frequency values, service provider values (e.g., service provider names and/or identifiers), content imbedded information values, and/or genre values. Such values might be of various data types such as, for instance, integers, strings, characters, and/or floating point numbers.

Specification regarding how data values associated with a service established as corresponding to an accessible service entry should also be associated with a service available in the area to which a node and/or other computer has moved might, for instance, be provided by a system administrator, a service provider, and/or a user. Such specification might, for instance, be provided with respect to one or more accessible service entries, with respect to one or more services, and/or with respect to all services and/or accessible service entries.

Such specification might, in various embodiments, take a number of forms. For example, such specification might indicate that in the case where a particular specified data value (e.g., a particular specified unique identifier value) associated with a service established as corresponding to an accessible service entry was also associated with a service available in the area to which a node and/or other computer has moved, that the service established as corresponding to the accessible service entry should be considered to be available in the new area.

As another example, such specification might indicate that in the case where multiple specified data values (e.g., a particular specified title value and a particular specified corporate ownership value) associated with a service established as corresponding to an accessible service entry were also associated with a service available in the area to which a node and/or other computer has moved, that the service established as corresponding to the accessible service entry should be considered to be available in the new area.

As yet another example, such specification might indicate a threshold sum to be met and point values for specified data values. In the case where the node and/or other computer found one of the specified data values to be associated with both a service established as corresponding to an accessible service entry and a service available in the area to which a node and/or other computer has moved, the node and/or other computer might add the point value indicated for that data value to a running total for the available service. In the case where the node and/or other computer found the running total to meet or exceed the threshold, it could consider the service established as corresponding to the accessible service entry to be available in the area to which a node and/or other computer has moved.

To illustrate by way of example, threshold of 100 points might be specified, with 75 points being specified for a match of title, 25 points being specified for a match of corporate ownership, 25 points being specified for a match of network affiliation, 25 points being specified for a match of genre, 25 points being specified for a match of indicated metadata, and 100 points being specified for a match of unique identifier.

Where the node and/or other computer determined for an accessible service entry that the service established as corresponding thereto was available in the area to which the node and/or other computer had moved (step 205), one or more operations could, in various embodiments, be performed. For example, the node and/or other computer could act to modify the service entry to allow access to the service as available at the new area (step 207). Such functionality might be implemented in a number of ways. For example, the node and/or other computer might modify the service entry to be associated with an IP address (e.g., IP multicast address), and/or frequency employable in accessing the service as available at the new area.

Where the node and/or other computer determined for an accessible service entry that the service established as corresponding thereto was not available in the area to which the node and/or other computer had moved, one or more operations could, in various embodiments, be performed. For instance, the node and/or other computer might act to determine if one or more similar services were available at the new area. Such functionality could be implemented in a number of ways.

Figure 3:
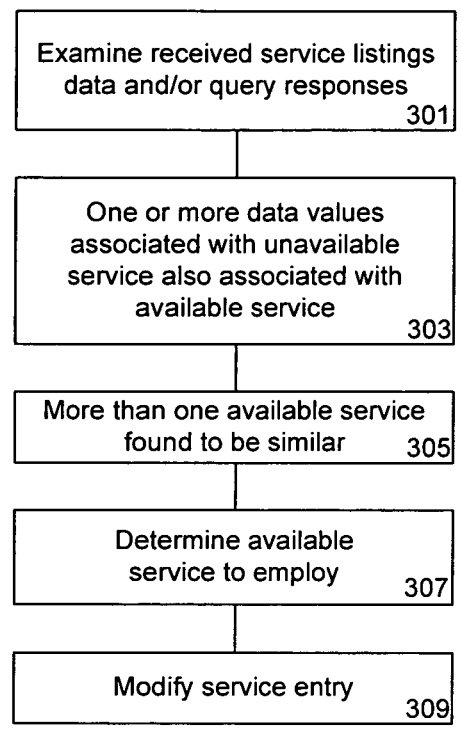
FIG. 3 shows further exemplary steps involved in location change operations according to various embodiments of the present invention.

With respect to FIG. 3 it is noted that, for example, perhaps in a manner analogous to that discussed above, the node and/or other computer might act to examine received service listings data and/or query responses regarding services available in the new area (step 301), and consider a service available in the new area to be similar to the unavailable service in the case where one or more data values (e.g., of the sort discussed above) associated with the unavailable service were (e.g., as indicated by received service listings data and/or query responses), also associated with the available service (step 303). Specification regarding how data values associated with an unavailable service should also be associated with available service might, for instance, be provided by individuals and/or entities of the sort discussed above. Moreover, perhaps in a manner analogous to that discussed above, such specification might, for example, be provided with respect to one or more accessible service entries, with respect to one or more services, and/or with respect to all services and/or accessible service entries. Such specification might, in various embodiments, take forms analogous to those discussed above.

For example, such specification might, perhaps in a manner analogous to that discussed above, indicate that in the case where a particular specified data value (e.g., a particular specified genre value) was found to be associated with both the unavailable service and the available service, that the available service should be considered similar to the unavailable service. As another example, such specification might, perhaps in a manner analogous to that discussed above, indicate that in the case where multiple specified data values (e.g., a particular specified genre value and a particular specified corporate ownership value) were found to be associated with both the unavailable service and the available service, that the available service should be considered similar to the unavailable service.

As yet another example, perhaps in a manner analogous to that discussed above, such specification might indicate a threshold sum to be met and point values for specified data values. Perhaps in a manner analogous to that discussed above the node and/or other computer might act, in the case where it found one of the specified data values to be associated with both the unavailable service and an available service, add the value indicated for that data value to a running total for the available service. In the case where the node and/or other computer found the running total to meet or exceed the threshold, it could consider the available service to be similar to the unavailable service.

As another example of functionality whereby the node and/or other computer could act to determine if one or more services similar to the unavailable service were available at the new area, a recommendation list might be considered. Such a recommendation list might, for example, be received along with service listings data and/or query responses, be received from a server and/or other computer providing service listings data and/or query responses, and/or be received from another server and/or other computer. Such a recommendation list might, for instance, indicate for each of one or more services not available in the area to which the node and/or other computer has moved a recommended substitute service available in that area. To illustrate by way of example, such a recommendation list might suggest a particular financial news television service available in an area as a substitute for a particular financial news television service not available in the area.

It is noted that, in various embodiments, such a recommendation list might be created by a system administrator, a service provider, and/or a user. It is further noted that, in various embodiments, various functionality described herein whereby a node and/or other computer may act to determine if one or more services similar to an unavailable service were available might be combined. For example, a node and/or other computer might act to both keep a running total in view of a threshold sum and point values, and to consider a recommendation list.

Moreover it is noted that, in various embodiments, in the case where more than one available service was found to be similar to an unavailable service (step 305), one or more operations might be employed in order to determine which available service to employ (step 307). For example, in the case where running totals were kept in view of threshold sums and point values, the similar available service yielding the largest running total might be employed. As another example, random selection might be employed to choose from among similar available services one for employment. As further examples, the node and/or other computer might query its user (e.g., via a GUI and/or other interface), and/or preferences might be consulted. Such preferences might, for instance, be provided by a system administrator, a service provider, and/or the user.

In the case where the node and/or other computer found one or more similar available services, one or more operations might, in various embodiments, be performed. For example, the node and/or other computer might act to modify the service entry established to correspond to the unavailable service such that it corresponded to the found similar available service (or, in the case where multiple similar available services were found, to the similar available service chosen for employment) (step 309). Such functionality might be implemented in a number of ways. For example, the node and/or other computer might act in a manner analogous to that discussed above with respect to service entries establishment.

Figure 4:
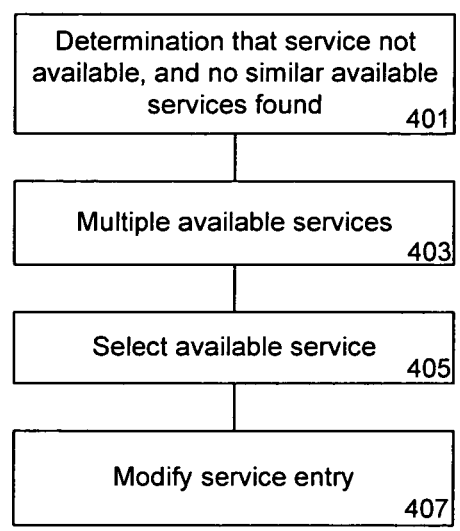
FIG. 4 shows still further exemplary steps involved in location change operations according to various embodiments of the present invention.

With respect to FIG. 4 it is noted that, in various embodiments, in the case where the node and/or other computer determined for an accessible service entry that the service to which the service entry was established to correspond was not available in the area to which the node and/or other computer had moved, and the node and/or other computer found no similar available services (step 401), one or more operations might be performed.

For example, the node and/or other computer might act to indicate to its user that the service entry could not be employed. For instance, the node and/or other computer might act to disable (e.g., gray-out) a GUI widget (e.g., button) corresponding to the service entry.

As another example, the node and/or other computer might act to modify the service entry such that it corresponded to an available service that was neither the service to which the service entry was established to correspond, nor a similar service (step 407). Such functionality might be implemented in a number of ways. Accordingly the node and/or other computer might, for instance, act in a manner analogous to that discussed above with respect to service entries establishment.

In the case where there are multiple such available services (step 403) one or more operations could, in various embodiments, be performed in order to select the available service to which the service entry should be modified to correspond (step 405). For example, the node and/or other could might, perhaps in a manner analogous to that discussed above, act to query its user and/or consult preferences (e.g., preferences provided by a system administrator, a service provider, and/or the user). Such preferences might, for instance, indicate for a particular service entry that the most desired service would be a news service, that the second most desired service would be a weather service, and that the third most desired service would be a sports service. As another example of selection of the available service to which the service entry should be modified to correspond, service order suggested by received service listings data and/or query responses might be taken into account.

It is noted that, according to various embodiments, in the case where a node and/or other computer changes location, one or more operations may be performed to provide the user of the node and/or other computer access to services, available at the new location, to which the user has not otherwise already been provided access (e.g., as services to which service entries have been established to correspond and/or as similar services). Such functionality may be implemented in a number of ways.

For example, new and/or empty service entries (e.g., empty user presets) might be made to correspond to such services available at the new location. Accordingly the node and/or other computer might, in various embodiments, act in a manner analogous to that discussed above with respect to service entries establishment. In various embodiments, the user might be able to specify (e.g., via a GUI) an empty service entry to be so employed.

It is noted that, in various embodiments, in the case where a node and/or other computer determines for an accessible service entry that the service to which the service entry was established to correspond is not available in the area to which the node and/or other computer has moved, the node and/or other computer might not take action to determine if one or more similar services are available. Instead the node and/or other computer might, for instance, indicate to its user, perhaps in a manner analogous to that discussed above, that the service entry cannot be employed.

It is further noted that, in various embodiments, data associated with a service entry at its establishment (e.g., data relating to the service to which the service entry was established to correspond) might be saved such that, for instance, it is not lost in the case where the service entry is, for instance, modified to allow access to the service as available at an area to which the node and/or other computer has moved, and/or modified to correspond to a similar service. Accordingly, in various embodiments, saving might be prior to any modification.

It is additionally noted that, in various embodiments, various operations might make used of such saved data. Such operations might, for example, include determination of availability, in an area to which a node and/or other computer has moved, of a service established as corresponding to a service entry, and/or determination of a similar service. It is also noted that, in various embodiments, one or more operations discussed herein as being performed by a node and/or other computer might instead be performed by another device such as, for instance, a server and/or other computer. Such a server and/or other computer might, for example, be one that provides service listings data and/or responds to queries regarding available services.

It is additionally noted that, in various embodiments, similar service may be of a different type than the service it is employed in lieu of. To illustrate by way of example, a radio service might be employed in lieu of a television service, and/or a television service might be employed in lieu of a push service.

In various embodiments, data corresponding to an area visited by a note and/or other computer (e.g., data regarding services to be employed in lieu of unavailable services and/or data regarding services available in the area) might be saved. Moreover, in various embodiments a node and/or other computer that has changed location might check to see if it has stored any such data and, perhaps after determining it to be still valid, might employ the data. Employing the data the node and/or other computer might, perhaps, not perform one or more of the operations discussed herein regarding location change operations.

It is noted that, in various embodiments, dispatch and/or receipt (e.g., of service listings data, queries, and/or query responses) might, for instance, involve IPDC, UMTS, GPRS, Bluetooth, UWB, WiFi, SMS, MMS, email, SOAP, JMS, RMI, MBMS, DVB (e.g., DVB-T, DVB-H, and/or DVB-S), DAB, DRM, IP, AM radio, FM radio (e.g., FM subcarrier), satellite radio, satellite television, NTSC television, and/or PAL television. For example, in various embodiments, receipt might be via blanking interval, an IPDC data stream might be received, a tuner of a node and/or other computer might be set to a particular frequency, a node and/or other computer might access data from a particular network address (e.g., an IP address), and/or a node and/or other computer might associate itself with a multicast address (e.g., an IP multicast address). In various embodiments, queries might be dispatched to a server and/or other computer (e.g., one operated by a service provider), and/or service listings data and/or query responses might be provided by such a server and/or other computer.

It is further noted that, in various embodiments, one or more handover operations may be performed in the case where a node and/or other computer changes location. Moreover, it is noted that in various embodiments a service entry, via location change operations, may come to correspond to and/or allow access to more than one service.

It is additionally noted that, in various embodiments, presentation order of channel list members and/or presets (e.g., as specified by a user) may be maintained with change of location of a node and/or other computer. For instance, presentation order may be maintained in presentation of channel list members and/or presets that takes into account service listings data corresponding to the new location.

Hardware and Software

Various operations and/or the like described herein may be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, phone, communication device, node, and/or the like, a server, a network access point, a network multicast point, a set-top box, a personal video recorder (PVR), a game console, a portable game device, a portable audio device, a portable media device, a portable video device, a television, a digital camera, a digital camcorder, a Global Positioning System (GPS) receiver, a wireless personal sever, or the like, or any combination thereof, perhaps running an operating system such as OS X, Linux, Darwin, Windows CE, Windows XP, Windows Server 2003, Palm OS, Symbian OS, or the like, perhaps employing the Series 40 Platform, Series 60 Platform, Series 80 Platform, and/or Series 90 Platform, and perhaps having support for Java and/or Net.

Figure 5:
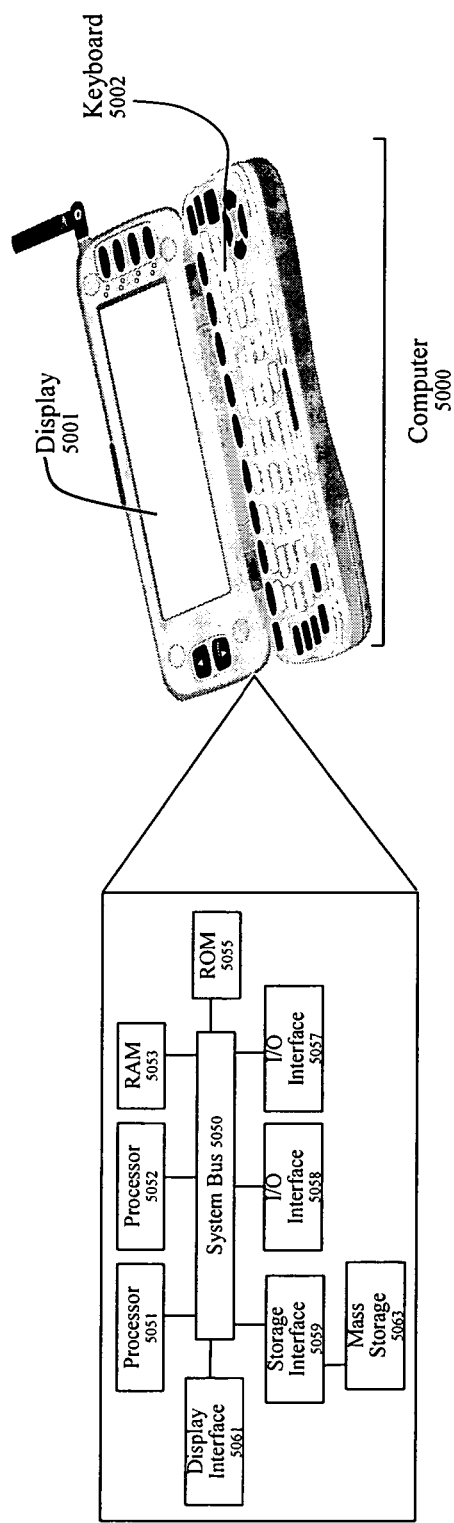
FIG. 5 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Shown in FIG. 5 is an exemplary computer employable in various embodiments of the present invention. Exemplary computer 5000 includes system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 may, for example, be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee, Bluetooth, Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Audio Broadcast (DAB), General Packet Radio Service (GPRS), Universal Mobile Telecommunications Service (UMTS), Global System for Mobile Communications (GSM), DVB-H (Digital Video Broadcasting: Handhelds), IrDA (Infrared Data Association), and/or other interface.

Mass storage 5063 may be a hard drive, optical drive, a memory chip, or the like. Processors 5051 and 5052 may each be a commonly known processor such as an IBM or Freescale PowerPC, an AMD Athlon, an AMD Opteron, an Intel ARM, an Intel XScale, a Transmeta Crusoe, a Transmeta Efficeon, an Intel Xenon, an Intel Itanium, an Intel Pentium, or an IBM, Toshiba, or Sony Cell processor. Computer 5000 as shown in this example also includes a touch screen 5001 and a keyboard 5002. In various embodiments, a mouse, keypad, and/ or interface might alternately or additionally be employed. Computer 5000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, Python, and/or Comega according to methods known in the art. Corresponding program code might be placed on media such as, for example, DVD, CD-ROM, memory card, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 6:
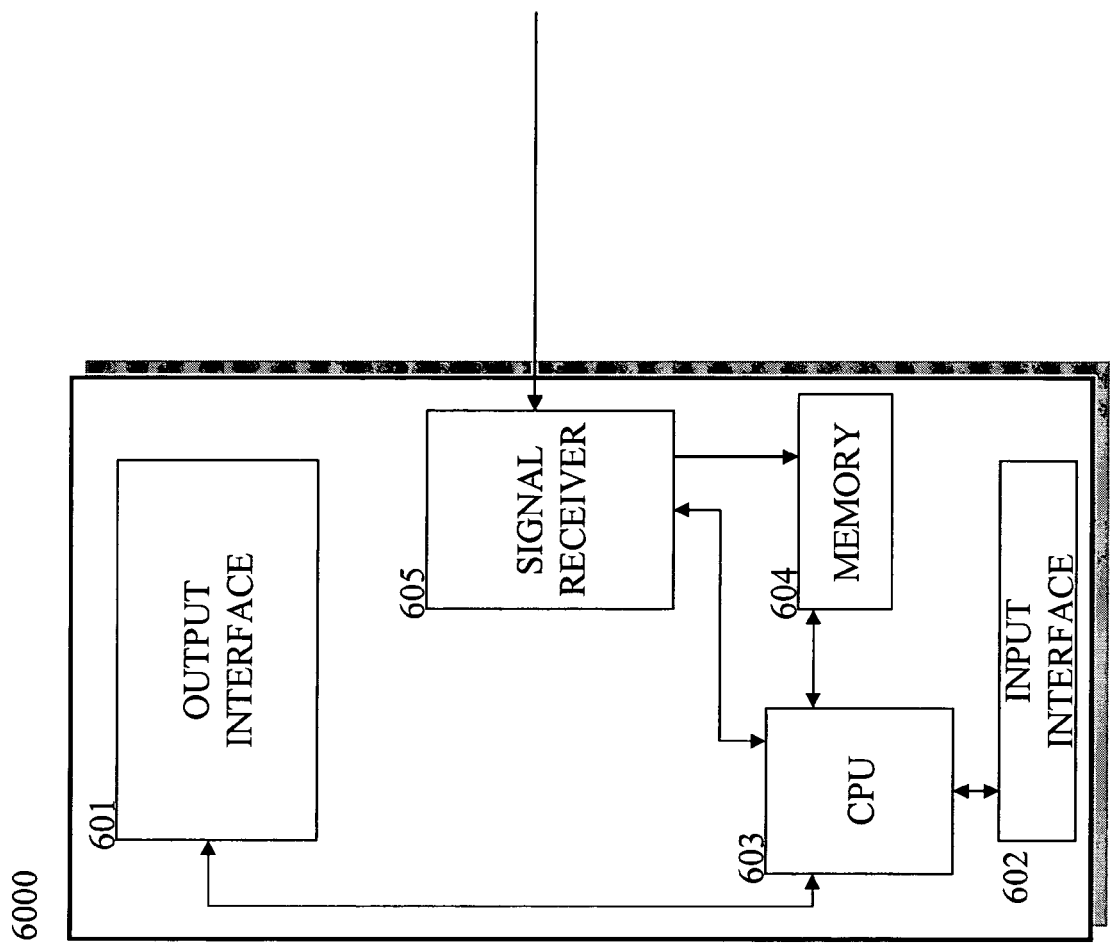
FIG. 6 shows a further exemplary computer.

Shown in FIG. 6 is a block diagram of a terminal, an exemplary computer employable in various embodiments of the present invention. In the following, corresponding reference signs are applied to corresponding parts. Exemplary terminal 6000 of FIG. 6 comprises a processing unit CPU 603, a signal receiver 605, and a user interface (601, 602). Signal receiver 605 may, for example, be a single-carrier or multi-carrier receiver. Signal receiver 605 and the user interface (601, 602) are coupled with the processing unit CPU 603. One or more direct memory access (DMA) channels may exist between multi-carrier signal terminal part 605 and memory 604. The user interface (601, 602) comprises a display and a keyboard to enable a user to use the terminal 6000. In addition, the user interface (601, 602) comprises a microphone and a speaker for receiving and producing audio signals. The user interface (601, 602) may also comprise voice recognition (not shown).

The processing unit CPU 603 comprises a microprocessor (not shown), memory 604 and possibly software. The software can be stored in the memory 604. The microprocessor controls, on the basis of the software, the operation of the terminal 6000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 6, alternatively, middleware or software implementation can be applied. The terminal 6000 can, for instance, be a hand-held device which a user can comfortably carry. The terminal 6000 can, for example, be a cellular mobile phone which comprises the multi-carrier signal terminal part 605 for receiving multicast transmission streams. Therefore, the terminal 6000 may possibly interact with the service providers.

RAMIFICATIONS AND SCOPE

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

What is claimed is:

1. A method, comprising:
    establishing, at a wireless node, a service entry corresponding to a first service, wherein the first service is available at a first area;
    determining, at the wireless node, the first service to not be available at a second area, wherein the wireless node has moved to the second area;
    determining, at the wireless node, a second service to be similar to the first service, wherein the second service is available at the second area; and
    modifying, at the wireless node, the service entry to correspond to the second service;
    wherein the second service is considered to be similar to the first service when one or more data values associated with the first service are also associated with the second service,
    wherein similarity of the second service to the first service is specified when a threshold sum of point values for specified data values is met or exceeded,
    wherein point values are specified for at least match of title, match of network affiliation, match of genre, and match of unique identifier,
    wherein, when the wireless node has moved to the second area, one or more operations is performed, the one or more operations making use of received service listings data, and
    wherein the received service listings data comprises one or more of channel listings data, EPG data, ESG data, and/or ISG data.

2. The method of claim 1, wherein the service entry is a user preset.

3. The method of claim 1, wherein the service entry is a channel list member.

4. The method of claim 1, further comprising:
    establishing, at the wireless node, a second service entry, wherein the second service entry corresponds to a third service, and wherein the third service is available at the first area;
    determining the third service to be available at the second area; and
    modifying the second service entry to allow access to the third service as available at the second area.

5. The method of claim 1, further comprising dispatching one or more queries regarding available services.

6. The method of claim 1, further comprising:
    modifying a service entry corresponding to a third service to correspond to a fourth service,
    wherein the fourth service is available at the second area,
    wherein the third service is not available at the second area, and
    wherein there is no service, similar to the third service, available at the second area.

7. The method of claim 6, wherein preferences are considered.

8. The method of claim 1, wherein the first service is of a first media type, and the second service is of a second media type.

9. The method of claim 1, further comprising determining if previously-stored data for the second area is accessible.

10. A wireless node, comprising: a processor configured to:
- establish, at the wireless node, a service entry corresponding to a first service, wherein the first service is available at a first area;
- determine, at the wireless node, the first service to not be available at a second area, wherein the wireless node has moved to the second area;
- determine, at the wireless node, a second service to be similar to the first service, wherein the second service is available at the second area; and
- modify, at the wireless node, the service entry to correspond to the second service,
- wherein the second service is considered to be similar to the first service when one or more data values associated with the first service are also associated with the second service,
- wherein similarity of the second service to the first service is specified when a threshold sum of point values for specified data values is met or exceeded,
- wherein point values are specified for at least match of title, match of network affiliation, match of genre, and match of unique identifier,
- wherein, when the wireless node has moved to the second area, one or more operations is performed, the one or more operations making use of received service listings data, and
- wherein the received service listings data comprises one or more of channel listings data, EPG data, ESG data, and/or ISG data.

11. The wireless node of claim 10, wherein the service entry is a user preset.

12. The wireless node of claim 10, wherein the service entry is a channel list member.

13. The wireless node of claim 10, wherein the processor is further configured to performs:
- establish, at the wireless node, a second service entry, wherein the second service entry corresponds to a third service, and wherein the third service is available at the first area;
- determine the third service to be available at the second area; and
- modify the second service entry to allow access to the third service as available at the second area.

14. The wireless node of claim 10, wherein the processor is further configured to dispatch one or more queries regarding available services.

15. The wireless node of claim 10, wherein the processor is further configured to:
- modify a service entry corresponding to a third service to correspond to a fourth service,
- wherein the fourth service is available at the second area,
- wherein the third service is not available at the second area, and
- wherein there is no service, similar to the third service, available at the second area.

16. The wireless node of claim 15, wherein preferences are considered.

17. The wireless node of claim 10, wherein the first service is of a first media type, and the second service is of a second media type.

18. The system wireless node of claim 10, wherein the processor is further configured to determine if previously-stored data for the second area is accessible.

19. A non-transitory computer-readable storage medium carrying one or more sequences of one or more instructions which, when executed by one or more processors, cause a wireless node to:
- establish, at the wireless node, a service entry corresponding to a first service, wherein the first service is available at a first area;
- determine, at the wireless node, the first service to not be available at a second area, wherein the wireless node has moved to the second area;
- determine, at the wireless node, a second service to be similar to the first service, wherein the second service is available at the second area; and
- modify, at the wireless node, the service entry to correspond to the second service,
- wherein the second service is considered to be similar to the first service when one or more data values associated with the first service are also associated with the second service, wherein similarity of the second service to the first service is specified when a threshold sum of point values for specified data values is met or exceeded,
- wherein point values are specified for at least match of title, match of network affiliation, match of genre, and match of unique identifier,
- wherein, when the wireless node has moved to the second area, one or more operations is performed, the one or more operations making use of received service listings data, and
- wherein the received service listings data comprises one or more of channel listings data, EPG data, ESG data, and/or ISG data.

* * * * *